United States Patent [19]

Winter et al.

[11] 4,149,048
[45] Apr. 10, 1979

[54] MOTOR VEHICLE SIGNAL SWITCH

[75] Inventors: Friedhelm Winter, Ludenscheid; Klaus Buhle, Schwerte; Ralf Eifer, Iserlohn-Letmathe, all of Fed. Rep. of Germany

[73] Assignee: Firma Leopold Kostal, Luedenscheid, Fed. Rep. of Germany

[21] Appl. No.: 790,405

[22] Filed: Apr. 25, 1977

[30] Foreign Application Priority Data

May 13, 1976 [DE] Fed. Rep. of Germany ....... 2621289
Oct. 28, 1976 [DE] Fed. Rep. of Germany ....... 2649329

[51] Int. Cl.² .......................... H01H 3/16; H01H 9/00
[52] U.S. Cl. ...................................... 200/61.54; 200/4; 200/61.27
[58] Field of Search ........................ 200/4, 61.27, 61.3, 200/61.34, 61.35, 61.54

[56] References Cited

U.S. PATENT DOCUMENTS 3,604,975  9/1971  Suzuki et al. ................. 200/61.27 X
3,892,932  7/1975  Erdelitsch et al. ........... 200/61.54 X
3,940,579  2/1976  Buhl et al. ................................. 200/4
3,944,765  3/1976  Kawai et al. .................. 200/61.54 X

FOREIGN PATENT DOCUMENTS 1553164  12/1968  France ................................... 200/61.54

Primary Examiner—James R. Scott
Attorney, Agent, or Firm—Victor E. Libert

[57] ABSTRACT

A motor vehicle steering column switch has a direction indicator blinker light switch which includes two engagement positions and two change of lane tipping positions. The switch also is automatically readjustable such as by a head lamp low beam flasher switch. The switch includes an integral switching lever having a tubular switching arm through which electrical leads are guided. The switching lever includes a catch extension and an operating extension molded from a thermoplastic material. A removable slide is provided to facilitate assembly of the electrical leads within the switching lever.

26 Claims, 11 Drawing Figures

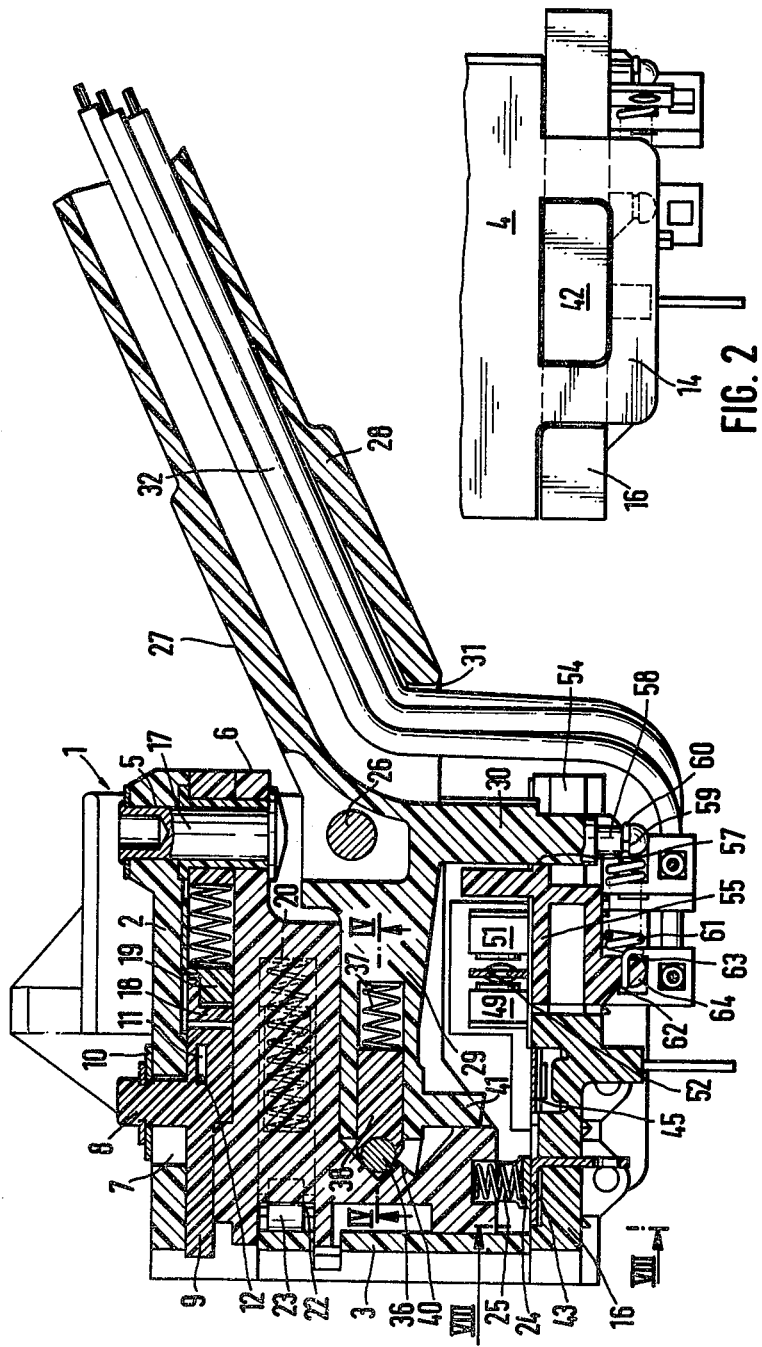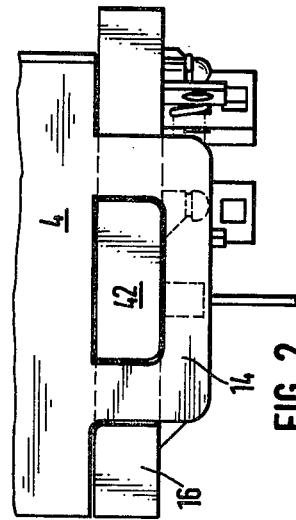

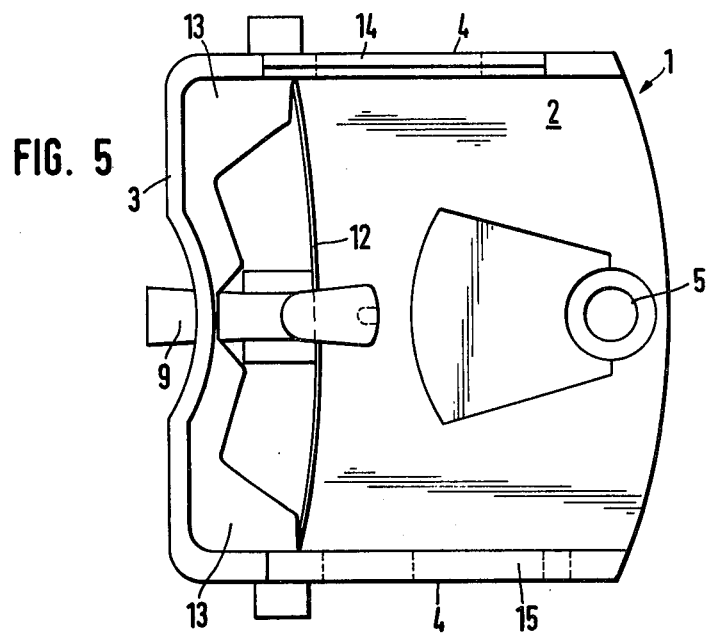
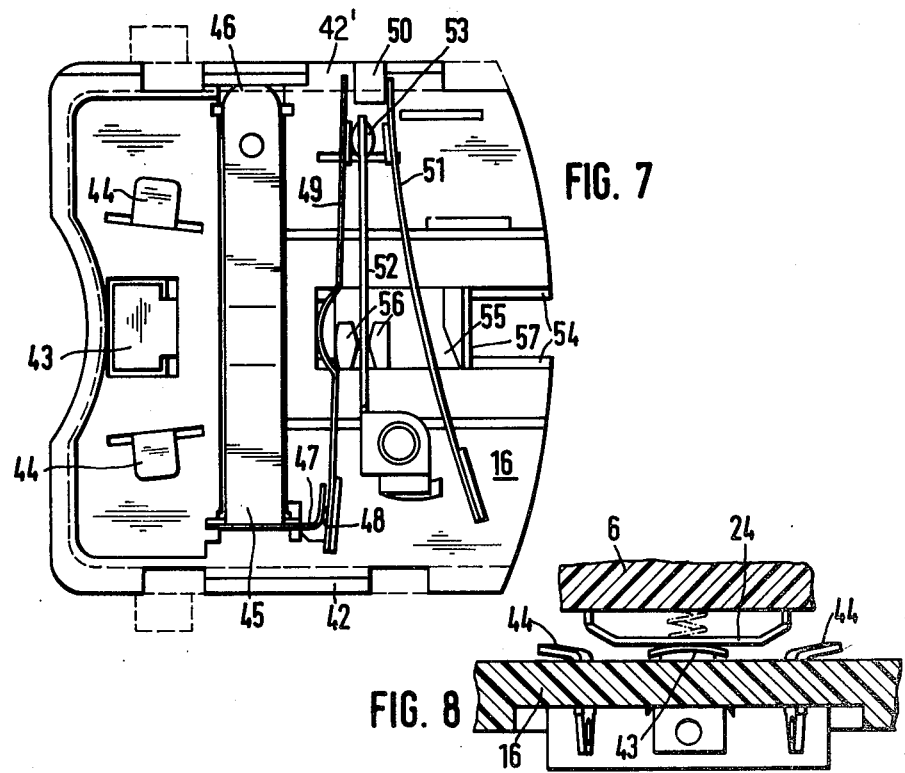

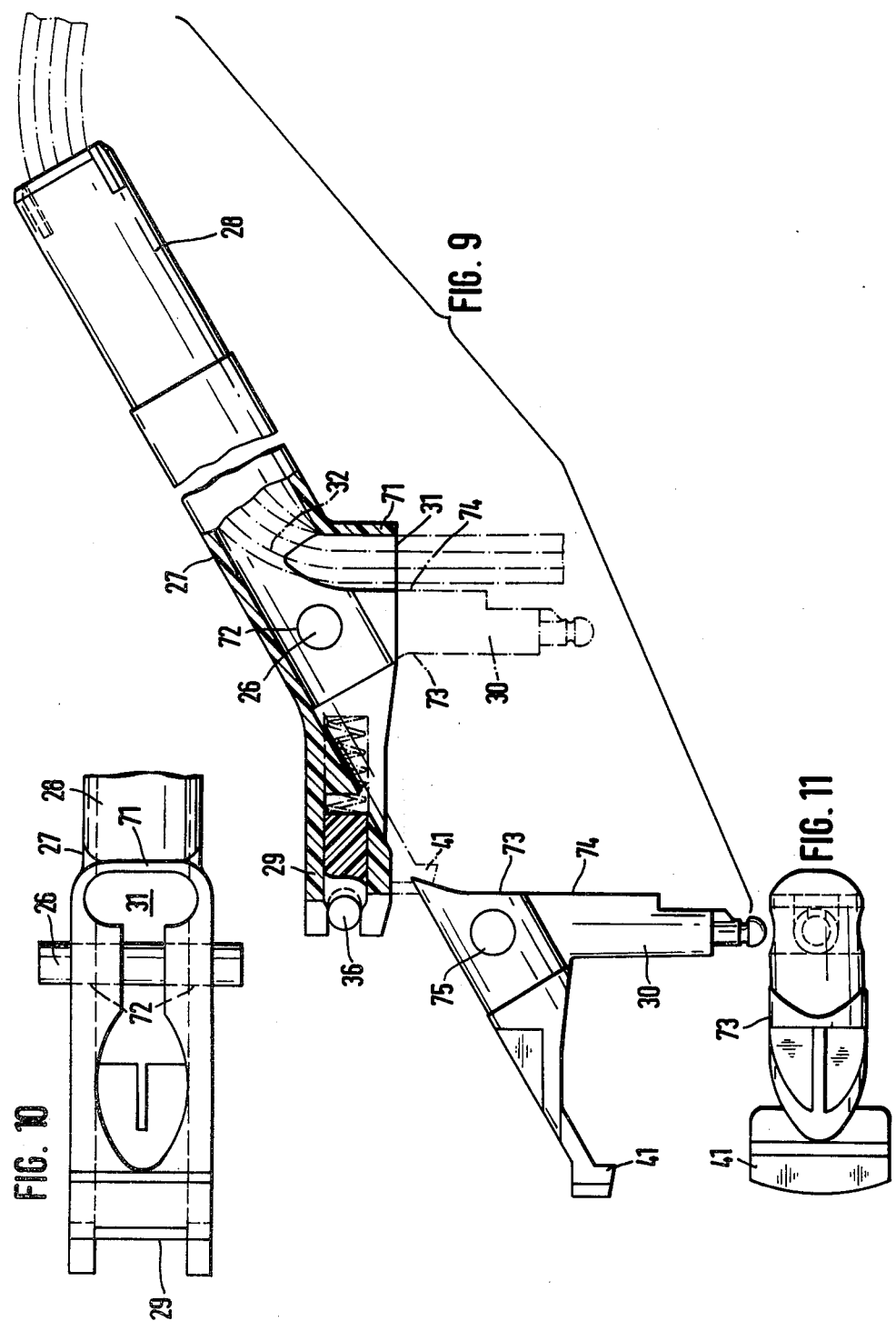

MOTOR VEHICLE SIGNAL SWITCH

BACKGROUND OF THE INVENTION

The present invention relates to a motor vehicle signal switch, of the type usually mounted on the motor vehicle steering column, and therefore sometimes hereinafter referred to as a steering column switch, which steering column switch has a direction indicator blinker light switch having two engagement positions and two change of lane tipping positions. The switch also is automatically readjustable such as by a driving-light headlamp low beam flasher switch, in the switch housing of which a direction indicator blinker light switching piece is pivotally supported about an axis which is parallel with the steering column, and receives a switching lever which is pivotal about an axis vertical to the first axis. The switching lever carries a catch extension cooperating with a switching profile and an operating extension cooperating with a change-over slide.

Prior art switches of this kind include a housing made of zinc die-casting, and having switching pieces often made of the same material. The switching lever supported in the switching piece consists of a round steel rod or a steel tube and is mounted within a bearing piece which is supported in the switching piece. For this reason the switching lever is relatively heavy. In order to avoid wrong connections or self-acting change-over in the case of strong vibrations on account of poor road conditions, the operating forces required to operate the switching must be set so high that the operation of the switch presents inconvenience. Also, in many cases, leads of a switch positioned at the end of the switching arm are guided through the switching arm and out of an opening of the tube at the foot-sided end. It is possible that at this opening of the tube the electrical insulation on the leads chafe through.

Furthermore, relatively long insulation ways are required not only at the lead connections but also within the switch and at the switching piece. Switching arms made of steel thus require expensive machining operations. Openings must be drilled or milled; moreover, provision of threads is also necessary. For protection against corrosion, a coat of lacquer or the provision of shrinkable plastic tubing is necessary.

SUMMARY OF THE INVENTION

In accordance with the invention there is provided a motor vehicle signal switch of the type adapted to be mounted on a motor vehicle steering column. The switch comprises a switch housing having a switch profile in the interior thereof and including within the housing a headlamp switch having a first contact and second contact. Also included within the housing is a direction indicator blinker light switch having engagement positions and change of lane tipping positions. A direction indicator blinker light switching piece is pivotally supported within the housing about a first axis. A molded plastic material switching lever has an integral catch extension and includes an operating extension and a hollow switching arm which has a free end. The switching lever is pivotally mounted on the housing about a second axis perpendicular to the first axis with the catch extension cooperating with the switching profile to effectuate blinker light switching. A change-over slide is slidably mounted within the housing with the operating extension cooperating with the change-over slide to effectuate headlamp switching between the first and second contacts. Electrical leads are disposed within and extend along the length of the hollow switching arm of the switching lever for connection at the free end thereof.

Certain objectives of the invention are attained when the housing and the switching lever are made of molded plastic material. Other objectives are attained when the operating extension is made integral with the switching lever. Alternately, the operating lever may be formed as part of an extension slide.

Still other objectives of the invention are attained when the signal switch further includes within the housing a change-over contact spring and a contact plate made of plastic material and having formed in it a rectangular section having lateral guides. The change-over slide is engageable by the operating extension of the switching lever to shift the change-over contact spring between the first contact and the second contact.

Electrical leads to make desired electrical connections are guided within the tubular switching arm. Advantageously, a control button for another function such as a wiper washer switch is arranged at the free end of the switching lever.

Certain objects of the invention are attained by providing the catch extension of the switching level as forked branches each having an elongated hole therein in which a spring loaded catch needle is provided.

The thermoplastic material is advantageously a molded thermoplastic. Any suitable thermoplastic material may be employed, such as, for example fiber glass-reinforced polyamide for the switching lever and polyamide reinforced by mineral fillers for the housing.

Accordingly, it is an object of the invention to provide a novel motor vehicle steering column switch of the above mentioned type which is of improved and economical design and which utilizes plastic material injection molded parts as much as possible. "Plastic" as used herein has the commonly accepted meaning of organic polymeric materials, particularly synthetic organic polymeric materials. More particularly, it is an object of the invention to provide an improved switch, the weight of the individual parts of which and, thus, of the complete switch, is reduced in order to thereby improve the function and operation of the switch.

According to the invention this and other objects are attained in that the switching lever together with the catch extension and, optionally, operating extension, is provided as an integral, one pice, plastic material injection molded part, the leads of a wiper-washer or other switch being guided within the tubular switching arm thereof, which wiper-washer or other switch is provided at the end of the switching lever with a control button.

The integral, one piece, configuration of the switching lever with the catch extension (and optionally with the operating extension) results in a considerable reduction in weight of the switching lever and also in a reduction of the number of the structural components required. Due to the fact that the material for the switching lever is electrically nonconducting, special insulation measures are not necessary for the leads guided into the switching arm. The switching lever also is made of a corrosion-resisting material. By the reduction in weight attained, it is possible to reduce the necessary switching forces so that there by safe functioning of the switch is improved. Furthermore, it is possible to decrease the switching angles. The resultant reduction of wear allows an increase in the number of switching cycles.

According to the invention the switch housing as well as the switching piece may consist of a thermoplastic material. This provides substantial improvements in the design, construction and structure of the switch.

Due to the fact that the leads guided through the tubular, hollow switching arm of the switching lever are extremely flexible and due to the fact that a larger number of up to six different leads is to be guided through the switching arm, the introduction of the leads should be carried out as easily and effortlessly as possible with respect to the economic assembly of the leads and of the switch. Accordingly, in one aspect, the present invention provides that an extension slide is movable in the direction of the longitudinal axis of the switching lever and is coupled with the switching lever by an axle, the aforesaid extension slide limiting the outlet opening through which the leads pass.

The extension slide, when extracted, releases the extension of the tubular switching arm so that the necessary leads may be drawn in a straight direction and without bending or deviation through the switching arm. After guiding the leads through the switching arm, the slide is moved in again and is tensionally coupled with the switching lever by the axle. Thereby the leads are deflected without additional assembly work so that they protrude through the outlet opening. Consequently, it cannot happen during assembly that the ends of the leads jam or that any other disturbance occurs, whereby it would be necessary to remove same by additional manipulations and working measures.

According to a preferred embodiment of the invention, the operating extension and the shift finger are molded upon the extension slide in an integral, one piece plastic material injection molded part. The outlet opening is defined, on the one hand, by a wall of the switching arm and, on the other hand, by a wall of the extension slide.

BRIEF DESCRIPTION OF THE DRAWINGS

Preferred embodiments of the invention are described as follows with reference to the attached drawings, in which:

FIG. 1 is a section view of one embodiment of a motor vehicle steering column switch according to the present invention;

FIG. 2 is a side elevation view of the lower portion (as viewed in FIG. 1) of the switch of FIG. 1;

FIG. 5 is a bottom view of the switch housing of the switch of FIG. 1;

FIG. 7 is a plan view of the contact plate of the switch of FIG. 1;

FIG. 8 is a section view along line VIII—VIII of FIG. 1;

FIG. 9 is a side view of another switching lever embodiment having a separate, removable slide, the inserted position of the slide being shown in dot-dash lines;

FIG. 10 is a partial bottom view corresponding to FIG. 9; and

FIG. 11 is a plan view of the slide of FIG. 9.

DESCRIPTION OF THE PREFERRED EMBODIMENTS

Figure 4:
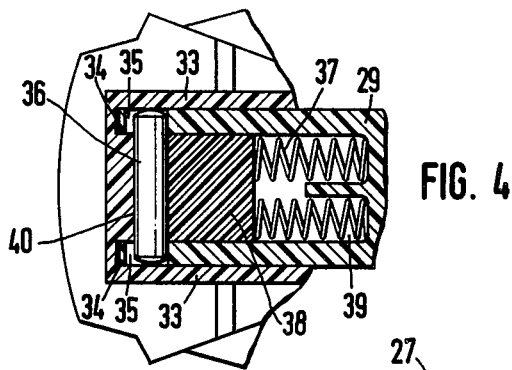
FIG. 4 is a section view along line IV—IV of FIG. 1.

In a preferred embodiment, the motor vehicle steering column switch according to the invention comprises (FIGS. 1 and 5) a housing 1 provided as a plastic material injection molded part, which housing comprises substantially a cover wall 2, a front wall 3, and two side walls 4. The cover wall 2 has a passage 5 which serves as bearing opening for a switching piece 6 (FIG. 1). Furthermore, as shown in FIG. 1, there is provided in the cover wall 2 a guide slot 7 in the form of a longitudinal hole, within which a pin 8 of a release slide 9, which is operative to automatically reset the switch is guided. The pin 8 is secured by a disk 10. The release slide 9, as shown in FIG. 1, contacts switching piece 6 and includes a transverse passage 11, a spring wire 12 (FIG. 5) extending therethrough which is supported in the side walls 4 of the housing 1. This spring wire 12 abuts the front wall of the transverse passage 11 and serves for the preloading as well as for the alignment of the release slide 9. At the front wall 3 there are switching profiles 13 (FIG. 5) for the direction indicator blinker light switching. These switching profiles 13 are provided with profiled sections for change of lane tipping positions. The side walls 4 comprise clip-eyes 14 and 15 which are designed to engage and retain extensions of a contact plate 16.

Figure 6:
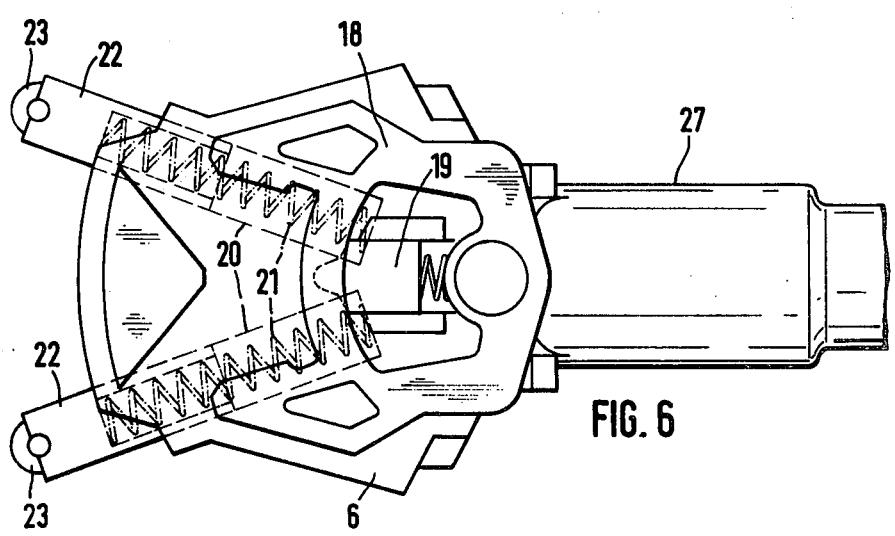
FIG. 6 is a plan view of the switching piece of the switch of FIG. 1.

Referring further to FIG. 1, switching piece 6 is pivotally supported by means of a rivet shaft 17 within cover wall 2 of housing 1. Rivet shaft 17 is aligned in parallel with the axis of the steering column. On rivet shaft 17 there is provided a reset element 18 (FIGS. 1 and 6) which is supported on a spring-loaded catch slide 19 which is slidable within a guide of cover wall 2. Switching piece 6 comprises two chambers 20 of rectangular cross-section, each receiving one pressure spring 21 and one guide part 22. At the front end of guide part 22 (FIG. 6) there is supported a catch roller 23, cooperating with one switching profile 13 each. As best seen in FIG. 8, at the lower portion of switching piece 6 there is located a contact bridge 24 which switches the flashlight electric circuits and is loaded by a spring 25. Within a chamber of switching piece 6 an axle 26 is provided perpendicularly to rivet shaft 17, about which axle 26 a switching lever 27 is pivotably mounted. Switching lever 27 comprises a switching arm 28, a catch extension 29 and an operating extension 30. The complete switching lever 27 including the aforesaid functional parts is provided as an integral, one piece, injection molded thermoplastic part. This is extremely advantageous for the production of the switching lever. The switching lever can be accurately molded to conform to its design in a suitable material. A plurality of other individual parts are combined with this integral one-piece structural component. In addition, the switching lever is made of a material which is corrosion-proof. Switching arm 28 is of tubular shape and is provided with an outlet opening 31 at the botton end thereof. Within switching arm 28 there are guided leads 32 which lead to a switch (not shown) at the top end of switching arm 28, e.g., a wiper-washer switch, which is located at the end of the switching arm with a control button. A contact carrier extension piece for this switch may be placed upon the switching arm.

Figure 3:
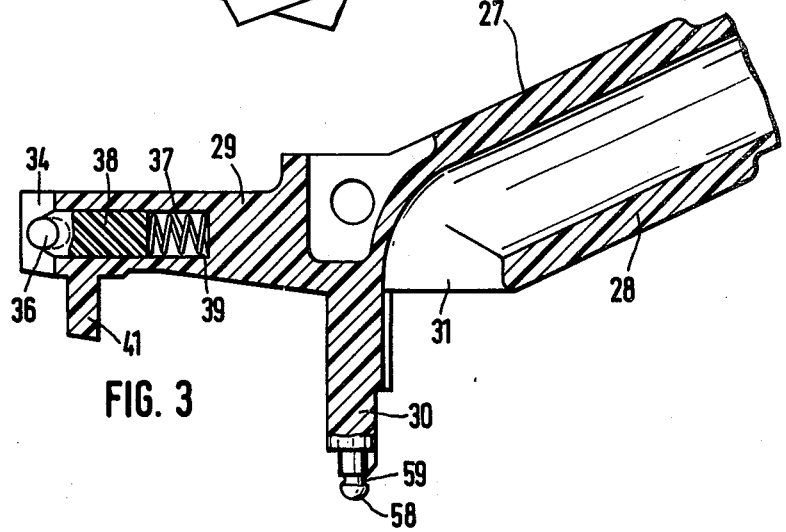
FIG. 3 is a partial view of the switching lever of the switch of FIG. 1.

Referring particularly to FIGS. 3 and 4, catch extension 29 is guided between walls 33 of switching piece 6. Catch extension 29 extends into fork branches 34 having one elongated hole 35 each. Within these elongated holes 35 there is guided a catch needle 36 which is preloaded by springs 37 via a pressure piece 38. The springs 37 and the pressure piece 38 are recieved within a chamber 39 of catch extension 29. Catch needle 36 is guided in the axial direction through the wall 33 of the switching piece 6 so that in the assembled condition of the switch a slipping out of the catch needle 36 in the axial direction is impossible. The catch needle 36 abuts a catch profile 40 (best seen in FIG. 1) for the traffic light change-over. A shift finger 41 for the operation of the headlamp flasher is provided upon catch extension 29.

Contact plate 16 receives the electrical contact elements. Contact plate 16 has lateral extensions 42 and 42' which, when pushing in the contact plate between the side walls 4, catch the clip-eyes 14 and 15 so that thereby the contact plate is kept within the housing in a catching manner. The contact plate 16 carries, on the one hand, the contact springs for the blinker light operation. Opposite to a medium contact 43 are contact springs 44 of contacts for the blinker light electric circuits. The contact springs 44 are inclined in a wedge-shaped manner in regard to the plane of contact plate 16, as particularly shown in FIG. 8. This inclination of contact springs 44 insures good contact with the contact bridge 24, even if the switching angles are small.

Referring now to FIGS. 1 and 7, contact plate 16 receives headlamp-flasher contact spring 45, the free end 46 of which is opposite to a cooperating contact. The connecting branch of the headlamp-flasher contact spring 45, extending through the contact plate, has an extension 47 which has a conducting connection with the connecting branch 48 of the driving-light contact spring 49. On the extension 47 and/or the connecting branch 48, bosses are pressed out in order to secure a permanent electrical connection, with these parts preloaded into contact with one another. There is provided an impact web 50 for the free end of the driving-light contact spring 49, which simultaneously serves as impact for the low-beam contact spring 51. The impact web 50 is dimensioned in such a manner that in the case of the traffic light change-over an overlapping contact-making with the change-over contact spring 52 is assured. Change-over contact spring 52 carries a double contact head 53 which is crowned on both sides and is arranged oppositely to corresponding contact linings of contact springs 49 and 51. All the contact springs are guided with connections through openings in contact plate 16, and terminate in plug contacts or soldering contacts.

Referring now to FIGS. 1, 3 and 7 contact plate 16 includes guides 54 for a change-over slide 55. Change-over slide 55 carries two engaging webs 56 which receive between them change-over contact spring 52. The operating extension 30 of the switching lever 27 (FIG. 3) abuts an impact edge 57 of the change-over slide 55 (FIG. 7). Operating extension 30 ends in a bolt 58 having an annular groove 59 (FIG. 3). As seen in FIG. 1, annular groove 59 is engaged with an eye 60 of a helical tension spring 61. The helical tension spring 61 is, at its other end, placed with an eye 62 into annular groove 63 of a bolt 64 which is molded on the slide 55. The contact plate 16 carries further additional connecting pieces and contact pieces for the leads 32; this latter is not explained in detail since such construction is well known.

The Figures show the motor vehicle steering column switch in the normal position, where, according to FIG. 7, the driving light is switched on if the light circuit is switched on by a light switch. Turning of switching lever 27 counterclockwise about axle 26 moves catch extension 29 into the further engaging position of catch profile 40. The slide 55 is drawn to the right, as viewed in FIG. 7, so that the change-over contact spring 52 contacts the low-beam contact spring 51. The impact web 50 secures an overlapping driving light change-over. When the driving light circuit is switched off, then it is possible to operate the driving light headlamp-flasher contact spring 45 by the shift finger 41 by further turning of the switching lever across the second catch position of the catch profile 40 so that the end 46 of contact spring 45 contacts the cooperating contact. Thereby the driving-light circuit is directly closed so that an operation of the headlamp-flasher results.

By the turning of the switching piece 6 about the rivet shaft 17 the blinker light circuits are actuated in a known manner. The switching profiles 13 possess a tipping position and on engagement or catch position. These switching operations are known to those skilled in the art; therefore, they are not described in detail. However, the contact springs 44 must extend in an inclined manner in regard to the plane of the contact plate 16 so that even in the case of a small switching angle safe operation of the blinker light electric circuits will be assured. Spring wire 12 provides, in accordance with the invention, a safe and simple guiding and alignment of the release slide 9. By the specific configuration of the transverse passage 11 with a front impact wall, complicated configurations of the spring can be avoided.

The outlet opening 31 allows an advantageous passage of the electrical leads 32. Sharp edges are easily avoided in the case of an injection molded part so that there is no risk of damage to the leads 32.

The switching lever 27 is provided as a thermoplastic injection molded part and comprises a tubular switching arm 28, having an operating handle (not shown), which may contain different function switches, such as wiper-washer switch, acoustic horn, and the like. The switching lever 27 comprises passages 72, aligned to one another for the receiving of a bolt-like shaft 26 which is received in the direction indicator blinker light switching piece and about which the switching lever 27 is pivotal. Adjacent to this shaft 26 a wall 71 is provided in an offset manner at the end of the switching arm 28 so that the leads 32 may be brought out through the outlet opening 31, limited by the wall 71 on one side.

There is integrally molded, in one piece, a catch extension 29 on the switching lever 27. The catch extension 29 receives a catch needle 36, the guides of which are not described in detail, but which runs in a catch profile.

According to one aspect of the invention, a separate switching lever slide component, upon which the operating extension is integrally molded, may be provided in lieu of the switching lever of FIGS. 1, 3 in which the operating extension 30 as well as the catch extension 29 are integrally molded upon a one-piece switching lever 27. In the second embodiment shown in FIGS. 9–11, a separate extension slide 73 is provided which is movable in the direction of the longitudinal axis of the switching arm 28. As shown in FIG. 9, by solid and dot-dash line rendition the slide 73 may be pulled out completely. There is molded on the slide 73, on the one side, a shift finger 41 for the headlamp-flasher contact and, on the other side, an operating extension 30 for a traffic light change-over slide. The slide 73 comprises a wall 74, the contour of which borders on the contour of the wall 71 and which, together with this wall 71, limits the outlet opening 31. In addition, the slide 73 has a passage 75 which, in the inserted condition for assembly to switching lever 27, is aligned with the passages 72 in accordance with the dot-dash illustration in FIG. 9 so that shaft or axle 26 may be placed through the passages 72 and 75. Thus, this shaft 26 also secures the extension slide 73 in the inserted condition to assemble the two parts into a unitary switching lever.

After taking out the slide 73, the axial passage of the switching arm 28 in the straight direction is completely free so that the superflexible leads 32 may easily be introduced. A deviation of these leads 32 is not necessary during introducing. Consequently, the assembly of these leads or lines is very simple and is possible in a time-saving manner.

After the introducing of the leads 32 the slide 73 is pushed in into the position as shown in FIG. 9 in dot-dash lines, in the axial direction of the switching arm 28. Thereby the leads 32 are cogently deflected so that the lead ends protrude out of the outlet opening 31. The slide 73 is supported in the inserted condition by the shaft 26 which is also used simultaneously for the bearing of the switching lever in the direction indicator blinker light switching piece. Of course, the slide 73 is also provided of a thermoplastic as injection molded part so that the switching lever altogether has insulating characteristics, and, consequently, any electric influence or damage of the leads 32 is not encountered.

Having thus described the invention, what is claimed is:

1. A motor vehicle signal switch of the type adapted to be mounted on a motor vehicle steering column comprises:
   (a) a switch housing formed by at least a front wall connecting a pair of spaced-apart side walls and having a switching profile in the interior thereof;
   (b) a contact plate supported within said housing, said contact plate carrying a headlamp switch having a first contact and a second contact, and a direction indicator blinker light switch having engagement positions and change of lane tipping positions;
   (c) a direction indicator blinker light switching piece having a catch profile formed thereon, said switching piece being pivotally supported within said housing about a first axis and engaging said switching profile for pivoting movement to selectively contact said blinker light switch positions;
   (d) a molded plastic material switching lever operatively associated with said switching piece for said pivoting thereof about said first axis, said switching lever having an integral catch extension, and including an operating extension and a switching arm having a free end, said switching lever being pivotally mounted on said switching piece about a second axis perpendicular to said first axis with said catch extension of said switching lever abutting said catch profile of lateral guides, piece to guide said pivoting of said switching lever about said second axis;
   (e) a change-over slide slidably mounted within said housing and carrying a change-over contact spring, said change-over slide being operatively associated with said operating extension whereby pivoting said switching lever about said second axis slides said change-over slide to contact said change-over contact spring selectively with one of said first and second contacts to effectuate headlamp switching between said first and second contacts.

2. The signal switch of claim 1, wherein said catch extension of said switching lever comprises two forked branches each having an elongated hole formed therein, and a spring-loaded catch-needle is guided within each of said elongated holes.

3. The signal switch of claim 2, wherein said switching piece includes side walls which are adjacent to said catch profile to guide said forked branches of said catch extension and thereby hold said catch needles in place.

4. The signal switch of claim 1 wherein said contact plate is made of plastic material and has formed therein a rectangular section having laterakl guies, said change-over slide being engageable by said operating extension of said switching lever to shift said change-over contact spring between said first contact and said second contact.

5. The signal switch of claim 4 wherein said first contact is a headlamp low beam contact spring and said second contact is a headlamp driving light contact spring.

6. The signal switch of claim 5, wherein said change-over slide is connected by a tension spring with said operating extension.

7. The signal switch of claim 4 including a headlamp flasher contact spring and a shift finger depending from said switching lever and operative by turning of said switching lever to contact said headlamp flasher contact spring with a cooperating contact member.

8. The signal switch of claim 7 wherein said first contact is a headlamp low beam contact spring, said second contact is a headlamp driving light contact spring, said low beam contact spring and said driving light contact spring having respective connecting branches which extend through openings in said contact plate and are respectively interconnected through said contact plate for electrical conduction.

9. The signal switch of claim 8 wherein said connecting branches are in resiliently abutting contact.

10. The signal switch of claim 4 wherein said switch housing is a plastic material injection molded part, and said contact plate is mounted in said switch housing.

11. The signal switch of claim 10 wherein said contact plate has extensions formed thereon and received in clip eyes formed in said housing.

12. The signal switch of claim 1 further including a release slide slidably mounted on said housing for movement operative to automatically reset said switch, said release slide contacting said switching piece and being guided by a pin disposed within a guide slot formed in said housing, and being secured by a disk embracing said pin.

13. The signal switch of claim 12, wherein said release slide is preloaded by a spring wire, the ends of which are inserted into two pockets formed in said housing opposite to one another.

14. The signal switch of claim 13, wherein said spring wire extends through a transverse passage of said release slide.

15. The signal switch of claim 1, wherein said switching piece is also made of plastic material, and includes two chambers arranged at an acute angle to the longitudinal axis of said switching lever, which chambers receive a spring-loaded catch device, and said switching profiles are uniform and are provided opposite to said catch devices on the interior of said switch housing.

16. The signal switch of claim 15, wherein each catch device is provided as a guide part longitudinally slidable within its associated chamber, which guide part carries a catch roller at its front end.

17. The signal switch of claim 4 further including a contact bridge on said switching piece and direction indicator blinker light contact springs on said contact plate, said blinker contact springs being inclined with respect to the plane of said contact plate and thereby are inclined to the direction of movement of said contact bridge.

18. The signal switch of claim 1, wherein said switching lever includes a switching arm having a longitudinal axis and further including an extension slide slidably mounted on said switching lever and slidable in the direction of the longitudinal axis of said switching arm, said extension slide being connected to said switching lever by an axle.

19. The signal switch of claim 18, wherein said operating extension is integrally formed with said extension slide.

20. The signal switch of claim 19, wherein said shift finger is integrally formed with said extension slide.

21. The signal switch of claim 18 wherein said extension slide has a wall portion and said switching arm has a wall portion and an outlet opening through which said leads are passed is defined between said respective wall openings.

22. The signal switch of claim 1 wherein said housing and said switching lever are made of molded plastic material.

23. The signal switch of claim 22 wherein said operating extension is integral with said switching lever.

24. The combination of the signal switch of claim 1 and a steering column of a vehicle wherein said signal switch is mounted on said steering column with said first axis disposed parallel to the axis of said steering column.

25. The signal switch of claim 24 wherein said operating extension and hollow switching arm are integrally molded of said plastic material as part of said switching lever.

26. A motor vehicle signal switch of the type adapted to be mounted on a motor vehicle steering column comprises:
(a) a switch housing formed by at least a front wall connecting a pair of spaced-apart side walls and made of molded plastic material and having a switching profile formed in the interior thereof;
(b) a contact plate supported within said housing, said contact plate carrying additional connecting pieces and contact pieces for electrical leads, a headlamp switch having a first headlamp low beam contact and a second driving light contact, said first and second contacts having respective connecting branches connected for electrical conduction;
(c) a direction indicator blinker light switching piece having a catch profile formed thereon, said switching piece being pivotally supported within said housing about a first axis and engaging said switching profile for pivoting movement to selectively contact said blinker light switch positions;
(d) a molded plastic material switching lever operatively associated with said switching piece for said pivoting thereof about said first axis, said switching lever having an integral catch extension comprising two forked branches each carrying a catch needle, and further including an operating extension and a hollow switching arm having a free end, said switching lever being pivotally mounted on said switching piece about a second axis perpendicular to said first axis with said catch extension of said switching lever abutting said catch profile of said switching piece to guide said pivoting of said switching lever about said second axis;
(e) a change-over slide slidably mounted within said housing and carrying a change-over contact spring, said change-over slide being operatively associated with said operating extension whereby pivoting said switching lever about said second axis slides said change-over slide to contact said change-over contact spring selectively with one of said first and second contact to effectuate headlamp switching between said first and second contacts; and
(f) electrical leads disposed within and extending along the length of said hollow switching arm of said switching lever, said leads being adapted for connection to said contact pieces and for connection at the free end of said switching arm to a function switch.

* * * * *